US009238992B2

(12) United States Patent
Moetakef et al.

(10) Patent No.: US 9,238,992 B2
(45) Date of Patent: *Jan. 19, 2016

(54) EXHAUST SYSTEM HAVING A FLOW ROTATION ELEMENT AND METHOD FOR OPERATION OF AN EXHAUST SYSTEM

(71) Applicant: Ford Global Technologies, LLC, Dearborn, MI (US)

(72) Inventors: Mohammad Ali Moetakef, West Bloomfield, MI (US); Steve Poe, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 252 days.

This patent is subject to a terminal disclaimer.

(21) Appl. No.: 13/897,231

(22) Filed: May 17, 2013

(65) Prior Publication Data

US 2014/0338309 A1 Nov. 20, 2014

(51) Int. Cl.
*F02B 27/04* (2006.01)
*F01N 1/00* (2006.01)
*F01N 13/10* (2010.01)
*F02F 1/42* (2006.01)

(52) U.S. Cl.
CPC . *F01N 13/10* (2013.01); *F02F 1/42* (2013.01); *F01N 2240/20* (2013.01); *F01N 2260/06* (2013.01)

(58) Field of Classification Search
CPC . F01N 13/10; F01N 2240/20; F01N 2260/06; F02F 1/42
See application file for complete search history.

(56) References Cited

U.S. PATENT DOCUMENTS

| 2,295,436 | A | * | 9/1942 | Tendler | 60/305 |
|---|---|---|---|---|---|
| 3,438,198 | A | * | 4/1969 | Bentele | 60/306 |
| 3,520,131 | A | * | 7/1970 | Briggs | 60/308 |
| 3,630,031 | A | * | 12/1971 | Grainger | 60/305 |
| 4,671,057 | A | | 6/1987 | Kronich | |
| 4,924,669 | A | | 5/1990 | Tsutsumi | |
| 5,113,838 | A | * | 5/1992 | Kim | 123/592 |
| 5,758,614 | A | | 6/1998 | Choi | |
| 5,916,134 | A | * | 6/1999 | Yang et al. | 60/299 |
| 6,158,412 | A | | 12/2000 | Kim | |
| 6,425,382 | B1 | | 7/2002 | Marthaler et al. | |
| 7,086,498 | B2 | | 8/2006 | Choi et al. | |
| 7,104,251 | B2 | | 9/2006 | Kim | |

(Continued)

FOREIGN PATENT DOCUMENTS

EP 0448769 A1 7/1990
JP WO2012020727 A1 * 2/2012 ............ F01N 13/16

OTHER PUBLICATIONS

Moetakef, Mohammad Ali et al., "Exhaust System Having a Flow Rotation Element and Method for Operation of an Exhaust System," U.S. Appl. No. 13/897,223, 22 pages.

*Primary Examiner* — Audrey K Bradley
*Assistant Examiner* — Jason Sheppard
(74) *Attorney, Agent, or Firm* — Julia Voutyras; Alleman Hall McCoy Russell & Tuttle LLP

(57) ABSTRACT

An exhaust system in an engine includes an exhaust passage including an outlet, in fluidic communication with at least one combustion chamber in the engine, and integrated into a cylinder head in the engine and a flow rotation element including at least one vane, the flow rotation element positioned in the outlet of the exhaust passage swirling exhaust airflow exiting the exhaust passage.

13 Claims, 6 Drawing Sheets

(56) References Cited

U.S. PATENT DOCUMENTS

| | | |
|---|---|---|
| 7,717,229 B2 | 5/2010 | Putnam |
| 8,230,676 B2 | 7/2012 | Harrer |
| 2006/0225697 A1* | 10/2006 | Huckelberry et al. ........ 123/306 |
| 2009/0007552 A1 | 1/2009 | Schmidt |
| 2009/0025368 A1 | 1/2009 | Sakimoto et al. |
| 2011/0047997 A1* | 3/2011 | Goplen et al. .................. 60/317 |
| 2012/0117944 A1* | 5/2012 | Zuccone ......................... 60/273 |
| 2013/0139493 A1* | 6/2013 | Imakawa et al. ................ 60/323 |

* cited by examiner

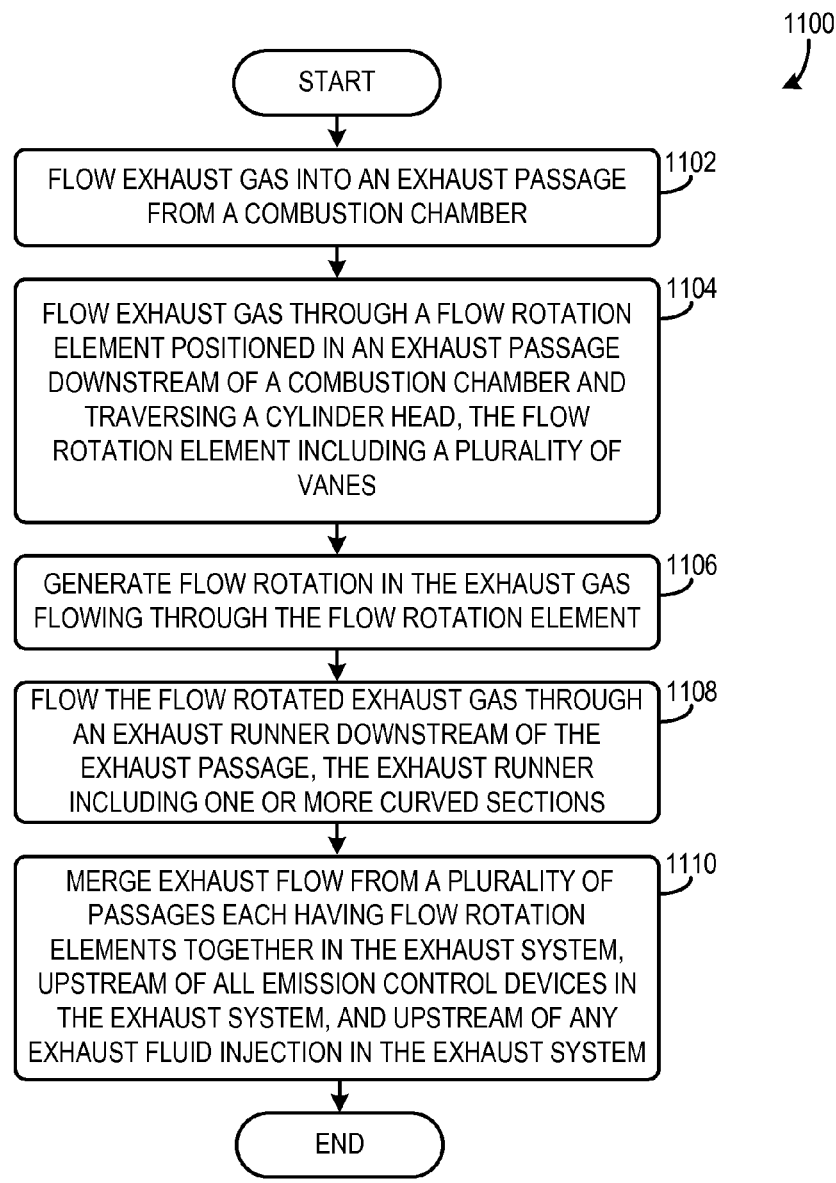

EXHAUST SYSTEM HAVING A FLOW ROTATION ELEMENT AND METHOD FOR OPERATION OF AN EXHAUST SYSTEM

FIELD

The present disclosure relates to an exhaust system including flow rotation elements and a method for operation of an exhaust system including flow rotation elements.

BACKGROUND AND SUMMARY

Exhaust systems receive exhaust gas generated as a product of combustion carried out in cylinders in internal combustion engines. The exhaust systems may include exhaust manifolds which receive exhaust gas from individual cylinders in the engine and merge the exhaust gas flow into a single exhaust passage. The intake manifold may be positioned external to a cylinder head in the engine or integrated into the cylinder head. Due to packaging constraints the exhaust manifolds as well as other exhaust conduits in the exhaust system may include a number of bends, curves, etc., which may increase back pressure and generate noise, vibration, and harshness (NVH) in the exhaust system.

U.S. 2009/0007552 discloses an exhaust manifold including tubes enclosed by a housing defining an interior section of the exhaust manifold. The inventors have recognized several drawbacks with the exhaust manifold disclosed in U.S. 2009/0007552. For instance, the exhaust manifold disclosed in U.S. 2009/0007552 is bulky, which increases the profile of the exhaust system. Moreover, the exhaust manifold disclosed in U.S. 2009/0007552 also generates a large amount of NVH which may only be partially attenuated by the interaction between the tubes and the interior region. As a result, customer dissatisfaction is increased. Further, it will be appreciated that other exhaust manifold designs may involve tradeoffs between compactness, noise attenuation, and back pressure generation.

The inventors herein have recognized the above issues and developed an exhaust system in an engine. The exhaust system includes an exhaust passage including an outlet, in fluidic communication with at least one combustion chamber in the engine, and integrated into a cylinder head in the engine and a flow rotation element including at least one vane, the flow rotation element positioned in the outlet of the exhaust passage swirling exhaust airflow exiting the exhaust passage.

The flow rotation element decreases flow separation and turbulence in the exhaust gas flow through the exhaust manifold, thereby reducing impingement and noise generated in the exhaust manifold. As a result, NVH within the exhaust system is decreased and customer satisfaction is increased. Moreover, positioning the flow rotation elements in the exhaust passages in the cylinder head may simplify manufacturing, thereby decreasing production costs.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

BRIEF DESCRIPTION OF THE DRAWINGS

FIG. 11 shows a method for operation of an engine exhaust system.

FIGS. 2-10 are drawn approximately to scale, however other relative dimensions may be used if desired.

DETAILED DESCRIPTION

An exhaust system having flow rotation elements positioned in outlets of exhaust passages in a cylinder head is described herein. The flow rotation elements are configured to generate flow rotation in the exhaust gas traveling through the exhaust passages to reduce flow separation and turbulence in downstream components, such as an exhaust manifold. As a result, exhaust flow impingement and noise generated in the exhaust manifold is reduced. Consequently, noise, vibration, and harshness (NVH) generated in the exhaust system is decreased thereby increasing customer satisfaction. Additionally, the likelihood of component degradation caused by NVH is reduced. The flow rotation elements include one or more vanes. In some examples, the vanes may extend in both an axial and a radial direction to generate the flow rotation. Specifically in one example, the vanes may be helically aligned to generate flow rotation. Utilizing the flow rotation elements as opposed to acoustic wrapping on the exhaust manifold may also increase the durability of the exhaust manifold. Moreover, utilizing flow rotation elements may also enable the mass of the exhaust system to be decreased, if desired, when compared to exhaust systems which may increase the wall thickness of the exhaust manifold to decrease NVH. Moreover, the flow rotation elements may not be affected by packaging constraints, since they are enclosed within the exhaust passages.

Figure 1:
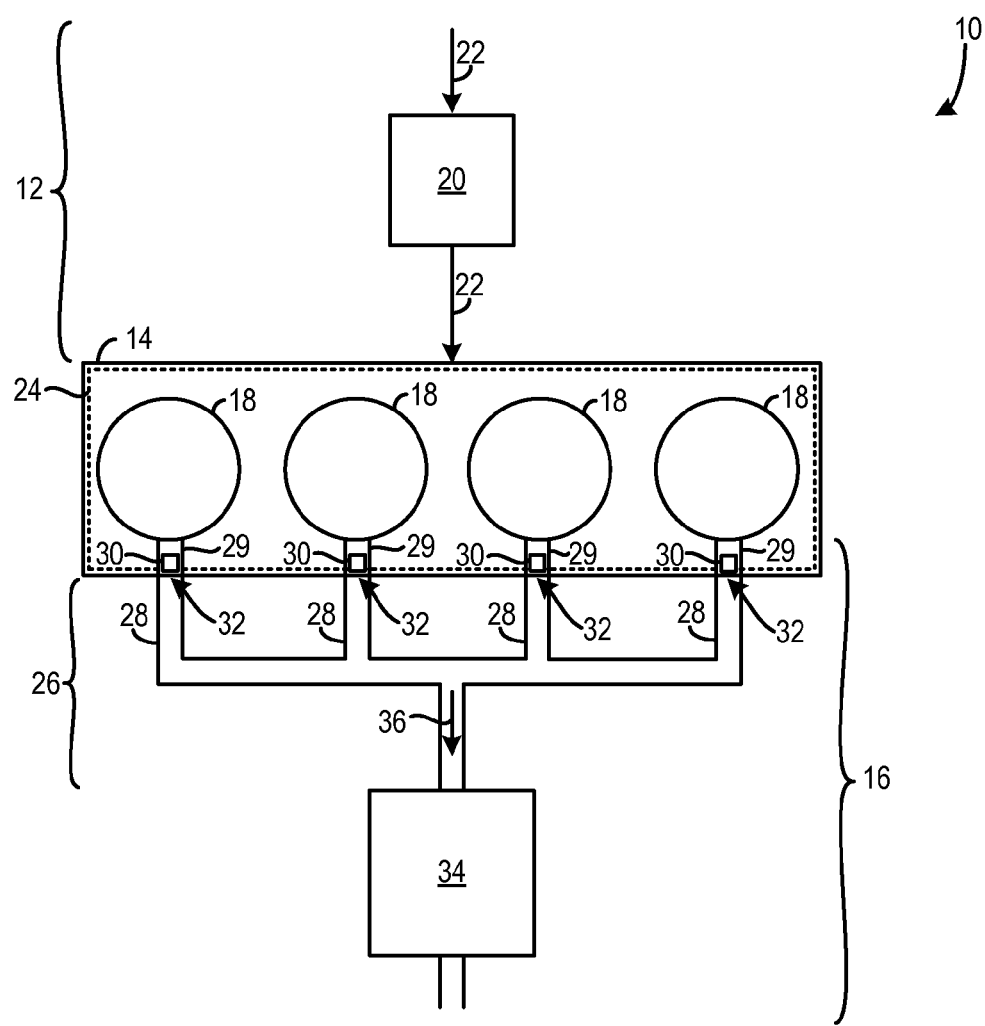
FIG. 1 shows a schematic depiction of an engine including an exhaust system.

FIG. 1 shows a vehicle 10 including an intake system 12, an engine 14, and an exhaust system 16. The intake system 12 is configured to provide intake air to cylinders 18 in the engine 14. The cylinders 18 may be referred to as combustion chambers. The intake system 12 includes a throttle 20. The throttle 20 may be positioned in an intake conduit. Arrows 22 depict the flow of air to and from the throttle 20. It will be appreciated that the intake system 12 may include additional components such as an air filter, compressor, a charge air cooler, an intake manifold, etc.

The engine 14 shown in FIG. 1 includes four cylinders in an inline configuration. However, engines having an alternate number of cylinders and/or cylinder having different alignments have been contemplated. The engine 14 may include a cylinder head 24 coupled to a cylinder block (not shown) forming the cylinders.

The exhaust system 16 includes an exhaust manifold 26. The exhaust manifold 26 is positioned external to the cylinder head 24 in the depicted example. However, in other examples the exhaust manifold 26 may be integrated into the cylinder head 24. The exhaust manifold 26 includes a plurality of exhaust runners 28. Each of the exhaust runners 28 is in fluidic communication with exhaust passages 29 in the cylinder head 24. Therefore, it will be appreciated that the exhaust passages 29 traverse the cylinder head 24. Flow rotation elements 30 are positioned in the outlets 32 of each exhaust passage 29. In other examples, a first portion of each of the flow rotation elements may be positioned in a respective outlet and a second portion of each of the flow rotation elements may be positioned in a respective exhaust runner. The flow rotation elements 30 are configured to swirl the exhaust gas passing through the exhaust passage in which they are positioned. Thus, the flow rotations elements swirl exhaust gas that is exiting the exhaust passage. Swirling the exhaust gas flow increased turbulence in the exhaust gas and decreases noise, vibration, and harshness (NVH) in the exhaust system. It may be desirable to position the flow rotation elements in the outlets of the exhaust passages when the exhaust manifold has a large number of curves, bends, etc., or when the exhaust manifold. Moreover, it may be easier to couple the flow attachment apparatuses to the outlets of the exhaust passages as opposed to other locations in the exhaust system.

The exhaust manifold 26 is schematically depicted as having perpendicular bends. However, it will be appreciated that the exhaust manifold may have a different geometry with additional complexity, which is discussed in greater detail herein. For instance, the exhaust manifold may include curved bends. Furthermore, the flow rotation elements 30 may be positioned in other exhaust passages in the exhaust system 16.

The exhaust manifold 26 is coupled to an emission control device 34. The emission control device 34 may be a catalyst, particulate filter, etc. Thus, the emission control device 34 is positioned downstream of the exhaust manifold 26 and the exhaust passages 29. Arrow 36 depicts the general flow of exhaust gas from the exhaust manifold 26 to the emission control device 34. It will be appreciated that the exhaust system may further include a turbine, additional emission control devices, a muffler, etc. Thus, any of the aforementioned components may be positioned downstream of the emission control device 34. Additionally, in some examples an exhaust conduit may be positioned between the exhaust manifold 26 and the emission control device 34. Furthermore, it will be appreciated that the exhaust system 16 may further include exhaust valves.

Figure 2:
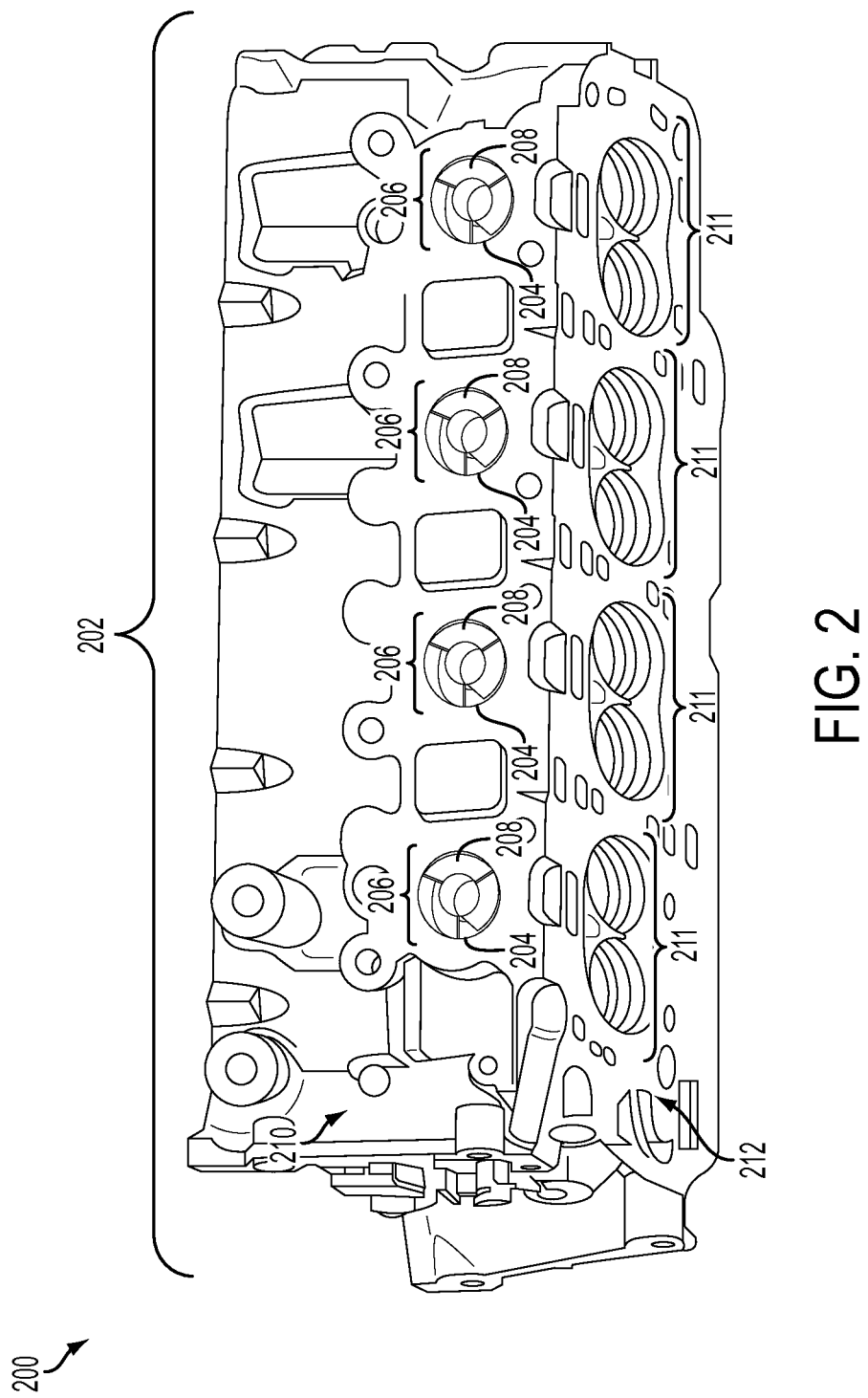
FIGS. 2 and 3 illustrate an example exhaust system including flow rotation elements.

FIG. 2 shows a first example exhaust system 200 including an example cylinder head 202 that may be included in an engine. The cylinder head 202 shown in FIG. 2 may be similar to the cylinder head 24 shown in FIG. 1. The cylinder head 202 includes a plurality of integrated exhaust passages 204. Thus, the exhaust passages 204 are integrated into the cylinder head 202 and therefore traverse a portion of the cylinder head. The plurality of exhaust passages 204 include outlets 206. Each of the outlets includes a central axis. Flow rotation elements 208 are positioned in the exhaust passage 204. Specifically, the flow rotation elements 208 are positioned in the outlets 206. However, other positions of the flow rotation elements 208 in the exhaust passages 204 have been contemplated. The flow rotation elements 208 are similar in size and geometry to the flow rotation element 600 shown in FIGS. 6 and 7. Continuing with FIG. 2, the flow rotation elements 208 generate flow rotation (e.g., swirling) in the exhaust gas flowing into an exhaust manifold 300, shown in FIG. 3 discussed in greater detail herein. Thus, the flow rotation elements are configured to swirl exhaust gas passing through the exhaust passage into the exhaust manifold. As a result, flow separation and turbulence in downstream sections of the exhaust system (e.g., exhaust manifold) are reduced. Consequently, NVH caused by turbulence in the exhaust manifold may be reduced, thereby increasing customer satisfaction.

The outlets 206 are positioned on a first side 210 of the cylinder head 202. Valve openings 211 are positioned on a second side 212 of the cylinder head 202. The valve openings 211 may be configured to receive intake and/or exhaust valves. The second side 212 may be a top side of the cylinder head 202 in one example.

Flow rotation elements 208 are thus positioned downstream of cylinder exhaust valves in the cylinder head, but before exhaust ports from different cylinders are merged together in the exhaust manifold. In one example, rotation elements 208 may have one end (e.g., the inlet end) flush with an interface surface of the cylinder head, or recessed by a distance less than the diameter of the exhaust tube in which they are mounted. Further, a length along the flow direction of the flow rotation elements 208 may be less than the diameter of the exhaust tube or port in which they are positioned. As described further below, the vanes of a single flow rotation element may be affixed to one another to form a unitary element that may be welded or press-fit into position. Further, the mounting of a plurality of the vanes of a single flow rotation element may be at edges of a relatively planar vane to enable flexibility of the vanes with respect to one another or another internal structural element sufficient to enable the unit to be press-fit into position and held in place without welding or any other mounting elements. In some examples, the vanes may be positioned around an interior cylindrical tube, as described in detail below. In one example, each and every exhaust passage outlet may include the same flow rotation element shape in the same position at the outlet, and upstream of merging regions of the exhaust manifold. However, in other example, only one or less then all of the outlets of the exhaust passages in the cylinder head may include a flow rotation element. For example, longer passages may include the flow rotation element, while shorter passages do not, or vice versa. In this way, the geometry of the flow rotation element may be selected based on the configuration of various components in the engine.

Figure 3:
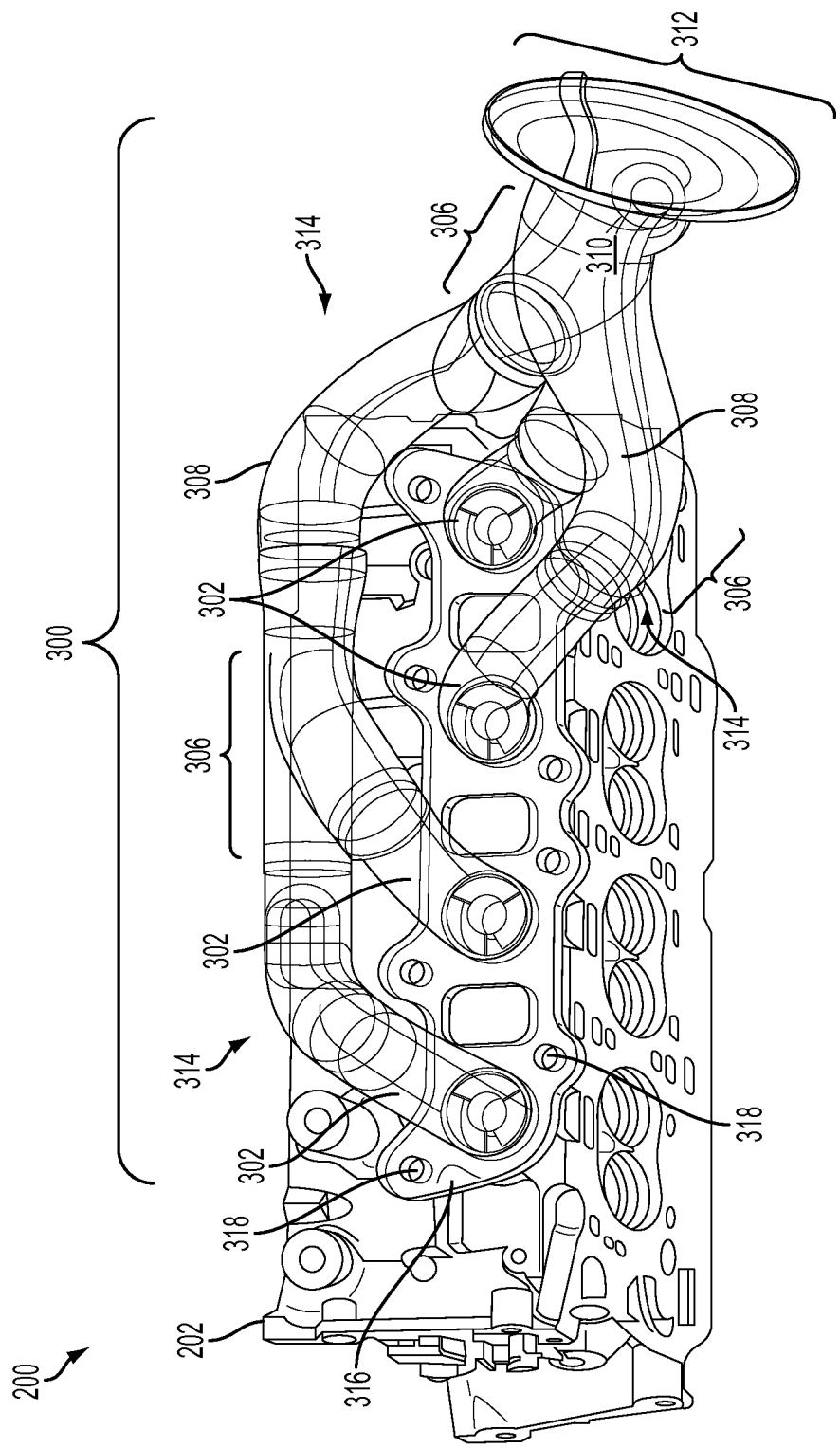

FIG. 3 shows the exhaust system 200 including the cylinder head 202 and an exhaust manifold 300. As shown, the exhaust manifold 300 is coupled to the cylinder head 202. Thus, the exhaust passages 204 are in fluidic communication with the exhaust manifold 300. As shown the exhaust manifold includes exhaust runners 302. The inlets of the exhaust runners 302 are configured to receive exhaust gas (i.e., swirled exhaust gas) from the exhaust passages 204, shown in FIG. 2, in the cylinder head 202.

Pairs of exhaust runners merge at confluence sections 306 to form merged runners 308. The merged runners 308 again merge to form an outlet conduit 310. The outlet conduit 310 includes an outlet 312. The outlet 312 is not parallel to the inlets of the exhaust manifold 300. However, other relative positions of the outlet 312 and the inlets of the exhaust manifold 200 have been contemplated. The outlet conduit 310 may be coupled to a downstream emission control device, such as the emission control device 34, shown in FIG. 1. The exhaust manifold 300 includes a plurality of bends 314 (e.g., curves) in the runners, conduits, etc.

A cylinder head coupling interface 316 (e.g., cylinder head coupling flange) is also included in the exhaust manifold 300.

The cylinder head coupling interface 316 includes coupling openings 318 configured to receive bolts or other suitable coupling apparatuses for coupling the exhaust manifold to the cylinder head 202. However, in other examples another suitable coupling technique may be used to attach the exhaust manifold 300 to the cylinder head. It will be appreciated that additional components may be included in the exhaust system 200 shown in FIGS. 2 and 3, such as the emission control device 34, depicted in FIG. 1.

Figure 4:
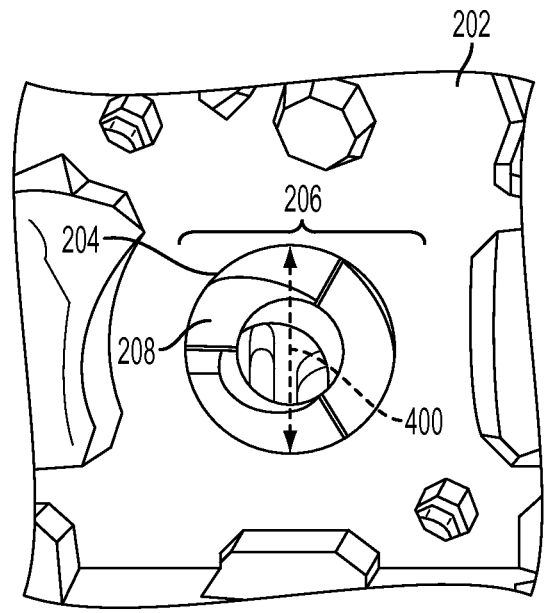
FIG. 4 shows a detailed view of the cylinder head included in the exhaust system shown in FIG. 2.

FIG. 4 shows a detailed view of one of the outlets 206 of one of the exhaust passages 204 in the cylinder head 202. One of the flow rotation elements 208 is also shown positioned in the outlet shown in FIG. 4.

Figure 5:
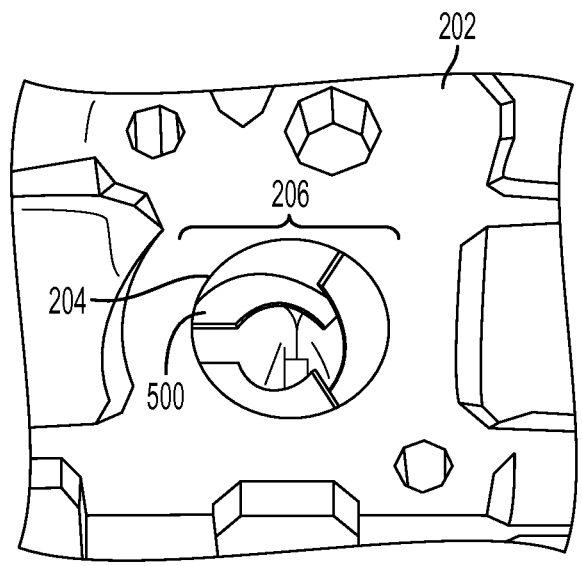
FIG. 5 shows a detailed view of a cylinder head including a flow rotation element positioned in an outlet of an exhaust passage.

FIG. 5 shows another type of flow rotation element 500 positioned in one of the outlets 206 of the exhaust passages 204 in the cylinder head 202. The flow rotation element 500 is similar to the flow rotation element 800 shown in FIG. 8. In another example, the flow rotation elements may be positioned partially in the outlet of the exhaust passages in the cylinder head and partially in the inlets of the exhaust manifold coupled to the exhaust passages.

Figure 6:
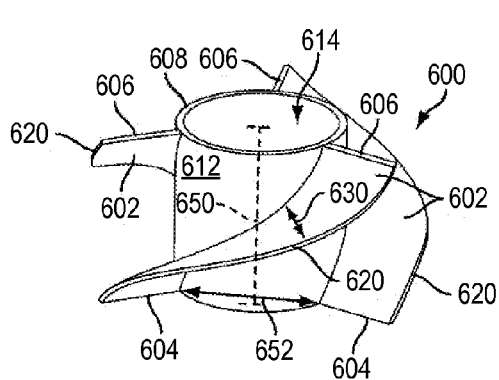
FIGS. 6 and 7 show a first example flow rotation element.
Figure 7:
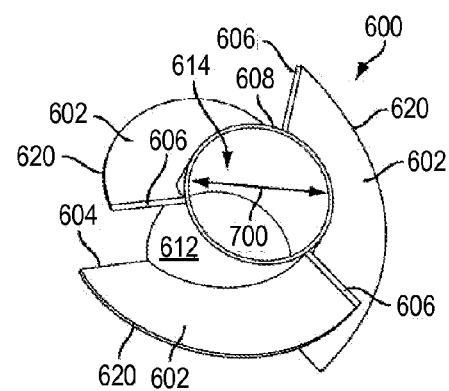

FIGS. 6 and 7 shows a first example flow rotation element 600. The flow rotation element 600 is similar in size and geometry to the flow rotation element 208 shown in FIG. 4. The flow rotation element 600 shown in FIGS. 6 and 7 includes a plurality of vanes 602. Each of the vanes 602 extend in an axial and radial direction. Specifically, the vanes may extend in an axial and radial direction with regard to a central axis of one of the outlets 206, shown in FIG. 2. As shown in FIG. 7 the vanes 602 are head-to-tail and do not radially overlap. However, in other examples the vanes may radially overlap. In this way, each of the vanes may extend around different radial ranges in the inlet of the exhaust runner. The vanes 602 may be helically arranged. Therefore, a separation 652, shown in FIG. 6 between adjacent vanes may not vary along the length of the vanes.

Figure 8:
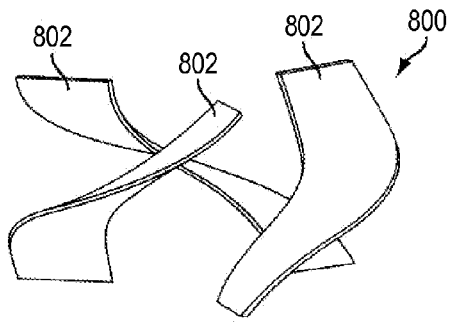
FIGS. 8-10 show additional example flow rotation elements.

Furthermore, each of the vanes 602 includes a leading edge 604 and a trailing edge 606, shown in FIGS. 7 and 8. The leading and the trailing edges for each vane are offset from one another. Specifically, the leading edge of the vane may be offset from the trailing edge of the vane by 120 degrees.

The flow rotation element 600 also includes a tubular structure 608. The vanes 602 are coupled to an outer surface 612 of the tubular structure. Additionally, the tubular structure has a tubular geometry which defines an interior tubular flow path 614. The tubular structure 608 has an inner diameter 700, shown in FIG. 7. A ratio between the inner diameter 700 of the tubular structure 608 and the inner diameter 400 of the inlet 206 of the exhaust passage 204, shown in FIG. 4, may be 0.5-0.8. It will be appreciated that the size of the interior tubular flow path 614 may be used to adjust the amount of flow rotation provided to the exhaust gas.

A ratio between the inner diameter 700 of the tubular structure 608 and an axial length 650, shown in FIG. 6, of the tubular structure 608 may be 0.75-3. Additionally, each of the vanes 602 shown in FIGS. 6 and 7 are identical in size and geometry. However, vanes having differing sizes and/or geometries have been contemplated.

Each of the vanes 602 also includes a peripheral edge 620. The peripheral edges 620 may be coupled (e.g., welded, press fit, cast, etc.) to an inner surface of one of the exhaust passages 204, shown in FIG. 2.

Additionally, a width 630 of one of the vanes 602 is shown in FIG. 6. A ratio between the inner diameter 700 shown in FIG. 7 and the width 630, shown in FIG. 6, may be 10-60.

FIG. 8 shows an example flow rotation element 800. The flow rotation element 800 shown in FIG. 8 is similar in size and geometry to the flow rotation element 500 depicted in FIG. 5. The flow rotation element 800 includes vanes 802 spaced away from one another. The vanes 802 are similar in geometry and size and are similar to the vanes 602 shown in FIGS. 6 and 7. However, the vanes 802 are spaced away from one another and not coupled to a tubular structure in FIG. 8.

Figure 9:
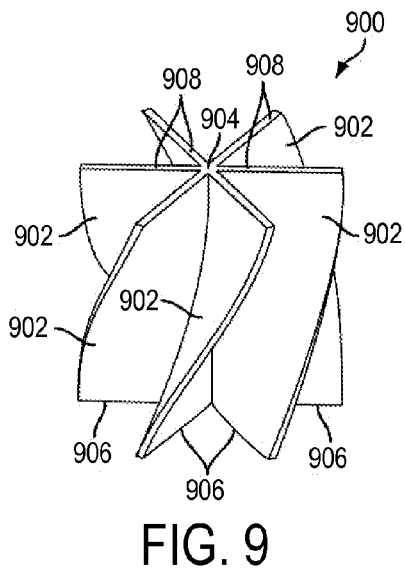

FIG. 9 shows a flow rotation element 900. It will be appreciated that the flow rotation element 900 may be positioned in one of the outlets 204 shown in FIG. 2. The flow rotation element 900 includes a plurality of vanes 902. Each of the vanes is coupled (e.g., welded) at a central axially aligned interface 904. The vanes 902 depicted in FIG. 9 are identical in size and geometry. Additionally, each of the vanes 902 shown in FIG. 9 includes a leading edge 906 and a trailing edge 908. The leading edges and trailing edges are radially aligned. Furthermore, an angle formed between the leading edge and trailing edge of each vane is 30 degrees.

Figure 10:
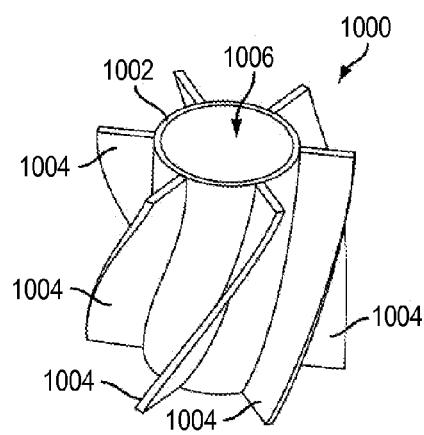

FIG. 10 shows an example flow rotation element 1000. It will be appreciated that the flow rotation element 1000 shown in FIG. 10 may be positioned in one of the outlets 204 shown in FIG. 2. The flow rotation element 1000 depicted in FIG. 10 includes a tubular structure 1002. A plurality of vanes 1004 are coupled to the tubular structure 1002. The tubular structure 1002 defines a boundary of an interior tubular flow path 1006.

FIG. 11 shows a method 1100 for operation of an exhaust system. Method 1100 may be implemented via the exhaust systems discussed above with regard to FIGS. 1-10 or may be implemented by other suitable exhaust systems.

At 1102 the method includes flowing exhaust gas into an exhaust passage from a combustion chamber. Flowing exhaust gas into an exhaust passage from a combustion chamber may include flowing exhaust gas into an exhaust passage traversing a cylinder head.

Next at 1104 the method includes flowing exhaust gas through a flow rotation element positioned in an exhaust passage downstream of a combustion chamber and traversing a cylinder head, the flow rotation element including a plurality of vanes.

Next at 1106 the method includes generating flow rotation in the exhaust gas flowing through the flow rotation element. At 1108 the method includes flowing the flow rotated exhaust gas through an exhaust runner downstream of the exhaust passage, the exhaust runner including one or more curved sections.

At 1110 the method includes merging exhaust flow from a plurality of passages each having flow rotation elements together in the exhaust system, upstream of all emission control devices in the exhaust system, and upstream of any exhaust fluid injection in the exhaust system.

Note that the example routines included herein can be used with various engine and/or vehicle system configurations. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An exhaust system in an engine, comprising:
an exhaust passage including an outlet, in fluidic communication with at least one combustion chamber in the engine, the exhaust passage integrated into a cylinder head in the engine;
a flow rotation element including at least one vane, the flow rotation element positioned in the head and in the outlet of the exhaust passage swirling exhaust airflow exiting the exhaust passage, where the flow rotation element includes a plurality of vanes coupled to an exterior surface of a tubular structure included in the flow rotation element, the vanes having an axial length from leading to trailing edge, the axial length fully inside the head; and
an exhaust manifold merging cylinder exits from the head upstream of a catalyst, the merging downstream of the flow rotation element.

2. The exhaust system of claim 1, where the outlet is directly coupled to the exhaust manifold including at least one exhaust runner, wherein an end of the vanes is flush with an interface surface of the cylinder head.

3. The exhaust system of claim 2, where the exhaust runner includes a curved section downstream of an inlet of the exhaust runner.

4. The exhaust system of claim 2, where the exhaust manifold includes a cylinder head coupling interface coupled to the cylinder head.

5. The exhaust system of claim 2, where the exhaust manifold is positioned external to the cylinder head in the engine.

6. The exhaust system of claim 1, where the vanes extend in a radial and axial direction with regard to a central axis of the exhaust passage outlet.

7. The exhaust system of claim 1, where the vanes are helically arranged.

8. The exhaust system of claim 1, where a ratio between an inner diameter of the tubular structure and an axial length of the tubular structure is 0.75-3.

9. The exhaust system of claim 1, where the vanes have a similar size and geometry.

10. An exhaust system in an engine, comprising:
an exhaust passage traversing a cylinder head, the exhaust passage in fluidic communication with a combustion chamber in the engine; and
a flow rotation element including a plurality of vanes, the flow rotation element positioned in the exhaust passage swirling exhaust airflow exiting the exhaust passage, where the vanes are coupled to a tubular structure.

11. The exhaust system of claim 10, where the vanes are helically arranged.

12. The exhaust system of claim 10, wherein the vanes are positioned around the tubular structure, the structure being an interior structure around which the vanes are positioned.

13. The exhaust system of claim 10, further comprising another exhaust passage traversing the cylinder head shorter than the exhaust passage having the flow rotation element, the another exhaust passage not having a flow rotation element having a plurality of vanes.

* * * * *